INVENTOR.
DONALD A. SKINNER
BY
Raymond N. Matson
his AGENT

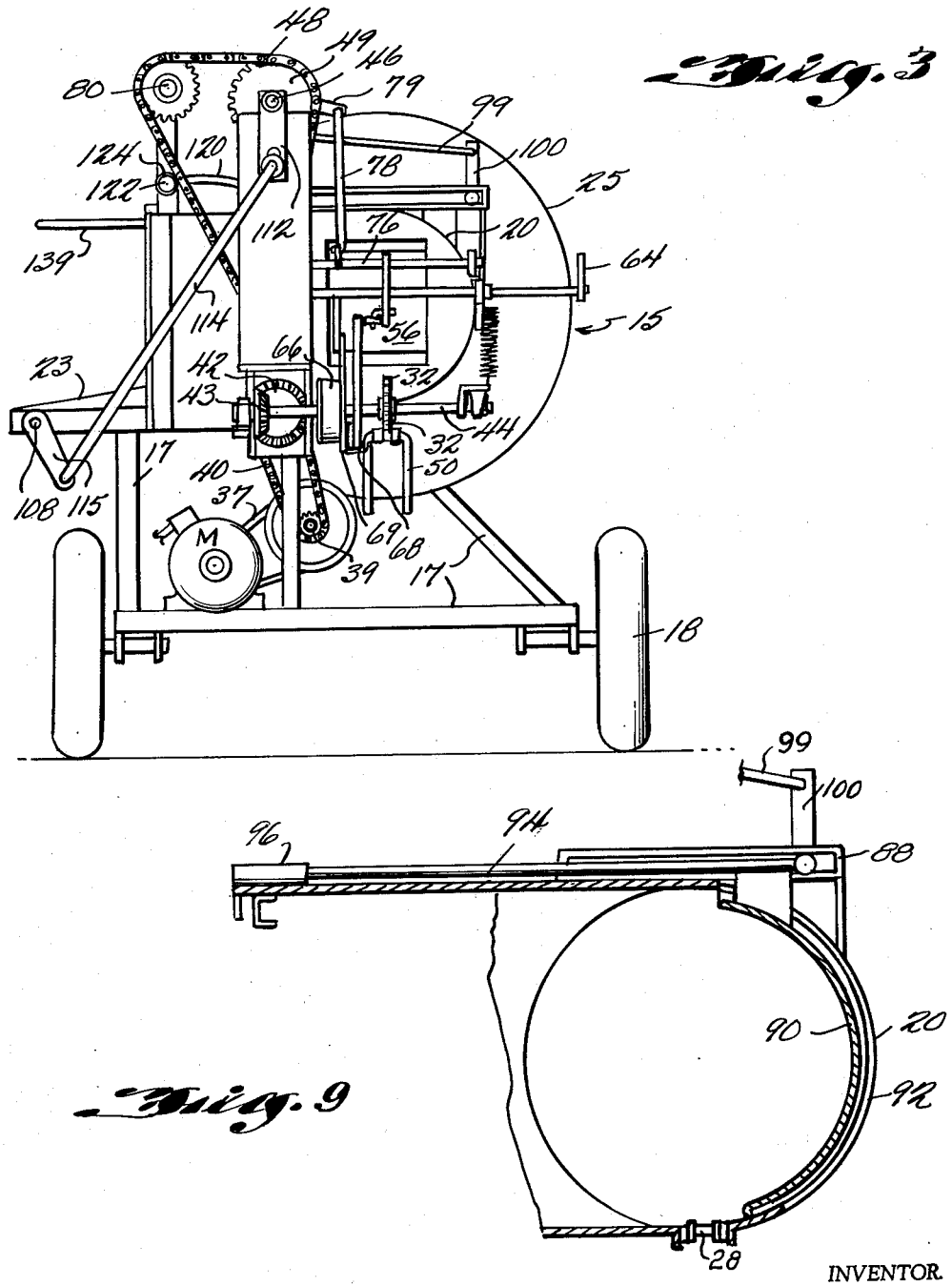

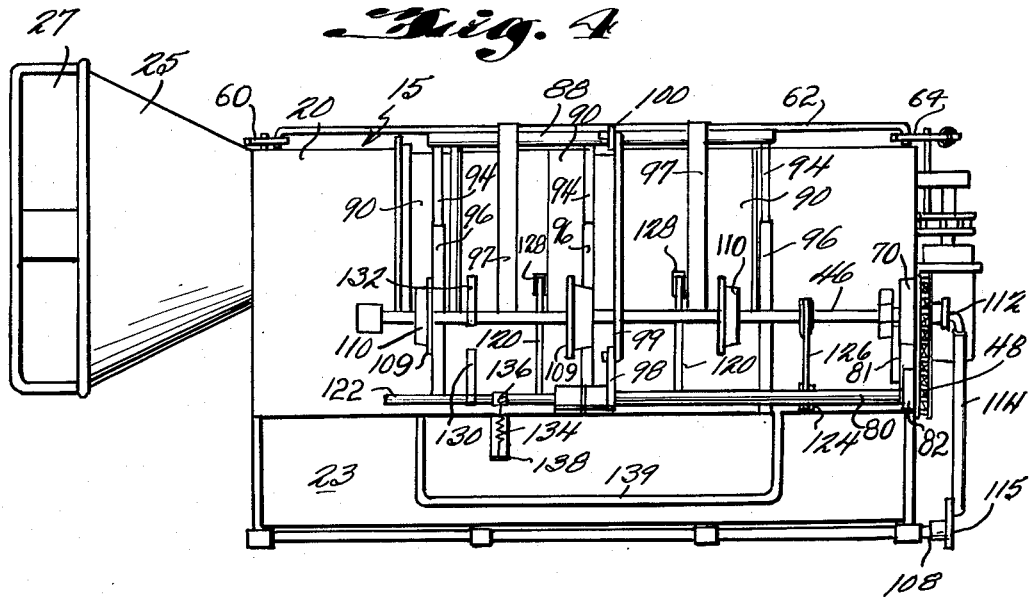
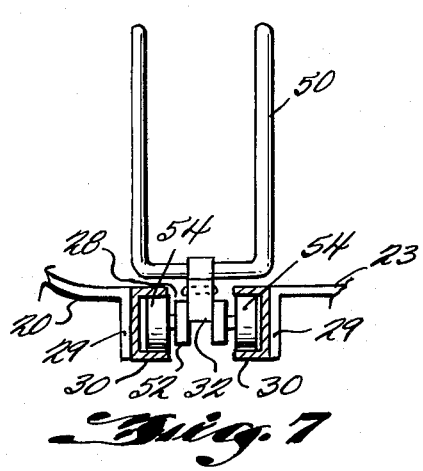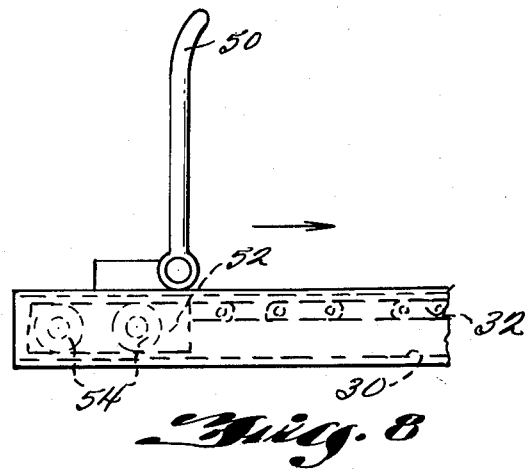

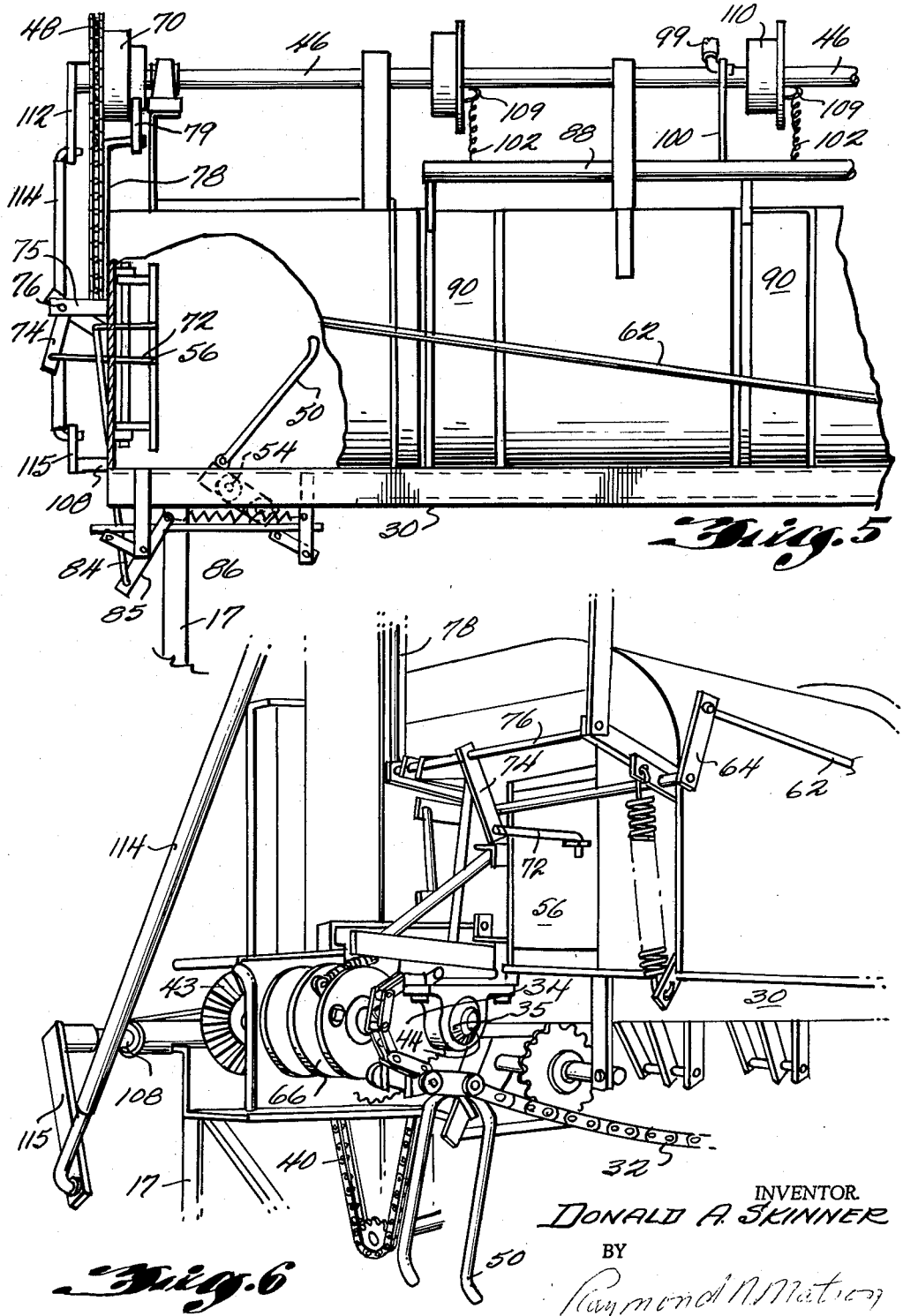

United States Patent Office 3,135,191
Patented June 2, 1964

3,135,191
TREE BALING APPARATUS
Donald A. Skinner, Old State Road, Binghamton, N.Y.
Filed Apr. 1, 1963, Ser. No. 269,250
10 Claims. (Cl. 100—4)

This invention relates generally to tree bundling apparatus and more particularly to an improved apparatus which will bale one or more trees so as to effect a reduction in their size for convenience in handling and to conserve space for shipping and storage purposes.

As is well known, thousands of evergreen or "Christmas" trees are cut each year in fields, forests, and nurseries, baled and shipped to cities. Such baling was originally done by time-consuming hand methods which in an effort to expedite the job, have been replaced at least partially by various types of apparatus most of which are characterized by one or more undesirable features.

Such features include: a cumbersomeness and immobility of design requiring that the trees be transported from the cutting site to the apparatus; a complexity of design in that elaborate mechanisms are provided to rotate the trees during tying or to rotate the twine tying means; the use of windlass means or tree nailing or clamping means which involves greater time requirements or the employment of additional operators; a poorly engineered design which either causes damage to the limbs of the trees or is easily overloaded resulting in breakdown of the apparatus with resultant costly repairs and waste of time; and an inability to bale trees materially more quickly or economically than the prior hand methods.

Accordingly, the main object of the present invention is to provide an improved apparatus for baling trees which will obviate the above and other undesirable features of known apparatus.

An important object of the present invention is to provide a tree baling apparatus which will compress tree branches toward the trunk without damage and retain them in compressed position by means of heavy twine substantially simultaneously applied thereto.

Another important object of the present invention is to provide an automatic apparatus for baling trees which requires but one operator and which will quickly engage a tree or trees placed on its feeding platform, compress its branches while moving it to a tying position, tie it with standard binder or baler knotters to maintain the branches in compressed position and eject it onto a discharge platform to complete a cycle and be in position for the operator to immediately initiate a following similar cycle with an additional tree or trees.

A further important object of the present invention is to provide an improved apparatus for bundling or baling trees comprising a confining tube having a funnel-like entrance so as to compress the branches toward the trunk which is pulled into the tube by a hook mounted on an endless chain which is topped by the engagement of the base of the trunk with a trip lever which also initiates further compressing and then tying mechanisms, and finally mechanism which ejects the tree or trees from the tube, the steps being automatically performed in timed sequence and the apparatus being returned to starting position for the initiation of another cycle by the single operator.

A still further important object of the present invention is to provide an apparatus of the type described wherein: a track is provided to maintain the hook in tree engaging position until the tree has been moved to the tying position; the tree-engaging chain hook is automatically disconnected from the tree when it has been moved to twine tying position; the hook trips a clutch lever to stop movement of the chain; and the tree trips a clutch lever to operate further compressing, tying, and ejecting mechanisms.

Another object of the present invention is to provide an improved tree baling apparatus of the type described wherein a novel spring pressed plate is used to regulate the tension of the twine passing from the twine storage box to the tying needles.

A further object of the present invention is to provide tree baling apparatus which is of low cost and efficient in operation, relatively light in weight and provided with wheels so as to be readily pulled to the tree cutting site, and which will be rugged and of long life in use and susceptible of ready and economic manufacture.

Other objects and advantages of the present invention will become apparent during the course of the following description:

In the drawings I have shown one embodiment of the invention: In this showing:

FIGURE 3 is an elevational view of the right end thereof;

FIGURE 4 is a top plan view thereof;

FIGURE 5 is a rear elevational view thereof showing a tree engaging hook just after leaving its confining track and in the process of turning rearwardly in disengaging from a tree;

FIGURE 6 is a perspective fragmentary view to an enlarged scale showing the rear of the right end of the apparatus with a hook in a tree disengaged position at the end of one cycle of operation of the apparatus;

FIGURE 7 is a front elevational view of a hook, its supporting rollers, and confining track;

FIGURE 8 is a side elevational view thereof; and

FIGURE 9 is a fragmentary, transverse sectional view to an enlarged scale of the apparatus taken on the line 9—9 of FIGURE 1 showing one of the compressor arms and its mounting in and on the tube.

Figure 1:
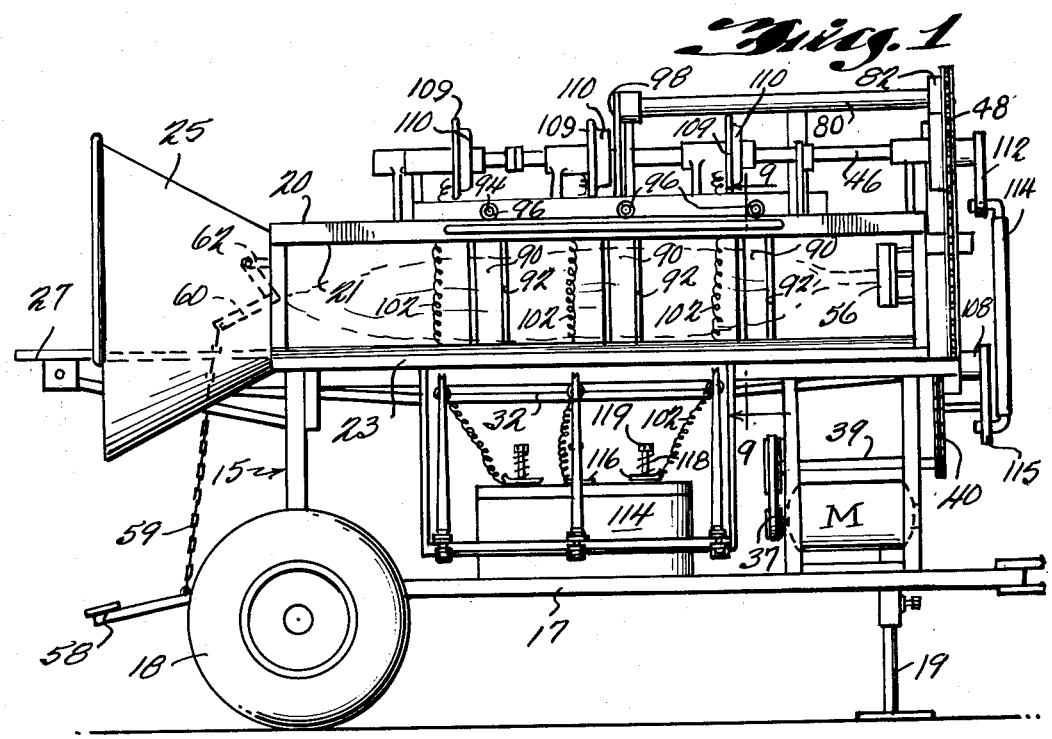
FIGURE 1 is a front elevational view of the improved tree baling apparatus comprising the present invention.

Referring to the drawings, numeral 15 designates the tree baling apparatus as a whole which is mounted on a semi-trailer frame 17 having rear wheels 18, vertically adjustable front supporting legs 19 for stationary use, and a trailer hitch (not shown) so that it may be readily pulled to a tree cutting site.

A horizontally disposed, longitudinally extending tube-like housing 20 is mounted on the frame 17 and is open at its front side as at 21 so that its bottom connects flush with an outwardly extending, downwardly inclined, discharge platform 23 upon which baled trees are ejected as will be described. The left or tree feeding end of the tree confining tube 20 comprises a funnel 25 within which a tree feeding or loading platform 27 is mounted level with the bottom of the tube.

The loading platform 27 and the bottom of the tube 20 include a centrally positioned, longitudinally extending, slot 28 defined by down-turned flanges 29 to which a pair of spaced channels 30 are fixed. An endless chain 32 is mounted within and coextensive with the slot 28 by means of an idler sprocket 33 (FIGURE 2) and a drive sprocket 34 (FIGURE 6) rotatably mounted on a shaft 44 having supporting bearings 35.

Power for the baling apparatus is supplied by a motor M which may be an internal combustion engine (or an electric motor where a source of current is available). Power to the endless conveyor chain is provided from the motor M by sprockets and a chain 37 to shaft 39 (FIGURES 1 and 3), by sprockets and a chain 40 to bevel gears 42; 43 driving the shaft 44 upon which the drive sprocket 34 is fixed. Power for the further compressing, tying, and ejecting mechanisms is delivered to their main drive shaft 46 above the tube 20 from a sprocket on a stub shaft on which the beveled gear 42 is mounted by means of a chain 48 and a sprocket 49.

As is clearly shown in FIGURES 2, 3, 6, 7 and 8, a pair of U-shaped hooks 50 are connected to equally spaced links on the chain 32 by their rigid mounting at one end of and to a pair of spaced vertical plates 52 provided with front and rear rollers 54 which track in the channels 30. As a hook 50 moves to the right end of the apparatus, it is maintained upright due to its rigid mounting on the roller 54 which are held in a horizontal plane by the channels 30. The channels terminate (FIGURE 5) adjacent a clutch-actuating trip lever 56 which actuates the further compressing, tying, and ejecting mechanisms to be described and permit the trailing rollers 54 to drop tilting the hook 50 so as to release the engaged branch or branches of a tree.

Initiation of movement of the hook-carrying chain 32 is effected by a foot treadle 58 connected by a chain 59 to an arm of a bell crank 60 and by a rod 62 to a second bell crank 64 pivotally mounted on the right end of the apparatus and connected to engage a dog clutch 66 on the hook chain drive shaft 44. The clutch 66 is disengaged to stop the hook carrying chain 32 by a bar 68 projecting laterally from the chain just in advance of each hook 50, the bar engaging a clutch disconnect lever 69 of the clutch (FIGURE 3).

When the chain 32 and hook 50 have moved a tree or trees against the trip lever 56, drive of the shaft 46 by the chain 48 is effected by engagement of the clutch 70 through a trip lever rod 72, crank arms 74, 75 pivoted at 76, lever 78, and clutch lever 79. Rotation of the shaft 46 effects rotation of shaft 80 through a clutch 82 interconnected by linkage 81 with clutch 70, sprockets and the chain 48. When a tree is ejected onto the discharge platform 23 after tying as will be described, the trip lever is returned to the clutch disengaged position by linkage 84, 85 and a spring 86 fixed to one of the channels 30 to stop rotation of the shaft 46.

When a tree is moved to tying position with its butt against the trip lever 56, it is behind the three strands of twine which are about to be applied thereto. The tree is pushed forwardly into the strands and thereby further compressed by a traveling fork 88 having three wide, spaced tines 90 which conform with the curvature of the tube 20 and, in the at-rest position (FIGURE 1), are flush with the wall by virtue of recesses 92 formed therein.

The fork is rigidly connected to three, connected spaced rods 94 which are reciprocable in guide bearing tubes 96 fixed to the top of the tube 20 and under overhead guide bars 97, the rods being reciprocated by a crank 98 on the drive shaft 80 which is connected by a link 99 to an upstanding stud 100 on the fork 88. Thus, a single rotation of the shaft 80 moves the tines 90 of the fork 88 toward the open front of the tube-like housing 20 to further compress a tree, and back to the inoperative position at the rear of the housing 20.

When the fork tines 90 are in the forward tree compressing position against the three twine strands 102, twine needles 104 mounted on a frame 106 which is pivoted for oscillation on a shaft 108, swing upwardly carrying the twine around the rear of the tree or trees up through apertures in the top of the tube 20 to where it is caught by the three holding discs 109 of a standard baler knotting mechanism 110 the elements of which are well known in the art. The needle supporting frame is oscillated in timed relation with the rest of the apparatus by a slotted crank arm 112 fixed to the right end of the drive shaft 46, a link 114 having its upper end slidably mounted in the slotted crank arm and having its lower end pivoted to a crank arm 115 fixed to the shaft 108. (FIGURES 3, 5, and 6).

As the twine needles 104 reach and pass through the knotting mechanism 110, the knot is tied, the twine is cut off, and the swinging downwardly of the three needles 104 then places the twine strands 102 for the next tree. It is important that the twine be drawn from the spools in the storage bin 114 with just the right amount of tension so as to avoid breakage or loose interfering loops. The cover of the bin has three spaced apertures through which the twine 102 is drawn and each of the apertures is closed by the gently upturned end of a flat plate 116 which is resiliently held against the cover by a spring 118 and a tension adjusting screw 119. The plate thus maintains the desired tension on the twine 102 as it passes through the bin apertures and under the plates 116.

Upon completion of the tying of a tree or trees in compressed condition, the final step of the tree baling cycle of the apparatus is the ejection of the trees upon the discharge platform 23. The ejection is effected by a spaced pair of arcuate rods 120 fixed to an oscillatory shaft 122 mounted in suitable bearings (124 of bearing bracket 126 at its right end). The ends of the ejector rods 120 in the at-rest position project downwardly into a pair of apertures 128 formed in the top of the housing 20. The shaft 122 has a cam arm 130 rigidly fixed thereto and extending upwardly and rearwardly and adapted to be struck by a heavy cam plate 132 fixed to the drive shaft 46 (FIGURES 1 and 4) upon each shaft revolution. The cyclic engagement of the cam plate 132 with the cam arm 130 pivots the shaft 122 counterclockwise (as seen from the loading or left end) against the action of a return spring 134 acting between a stud 136 on the shaft 122 and a bracket 138 to rock the ejection rods 120 into engagement with the tree to move it forwardly onto the discharge platform 23 which is provided with a guard rail 139.

The operation of the tree baling apparatus is believed to be obvious from the foregoing. One or more Christmas or other trees is placed on the loading platform 27 of the funnel 25 so that a bottom limb is engaged with one of the hooks 50. The single operator required for the apparatus now steps on the treadle 58 to engage, as explained, the clutch 66, the engine or motor M already being in operation. This drives the hook chain 32 to pull the tree through the compressing funnel 25 and into the generally tubular housing 20 between the three positioned strands of twine 102 and the back of the housing and the pusher forks 90.

The tree is pulled to the right end (FIGURE 1) of the housing 20 where the rear hook rollers 54 drop from the channel track 30 permitting the hook 50 to tilt rearwardly of the direction of motion and disengage itself from the tree limb. The chain lever 68 now strikes the clutch lever 69 to disengage the clutch and stop the endless hook chain 32. At this time the trunk of the tree has struck the trip lever 56 to engage the clutch 70 to drive the main shaft 46, and clutch 82 to drive shaft 80. This moves the compressor forks 90 forwardly to further compress the tree and then the needle frame 106 is actuated by linkage 112, 114, and 115 to rock the twine bearing needles 104 up to the holding and knotting mechanism 109, 110 to securely tie three twine loops about the compressed tree or trees, cut the twine, and arrange it ready for the next tree.

Figure 2:
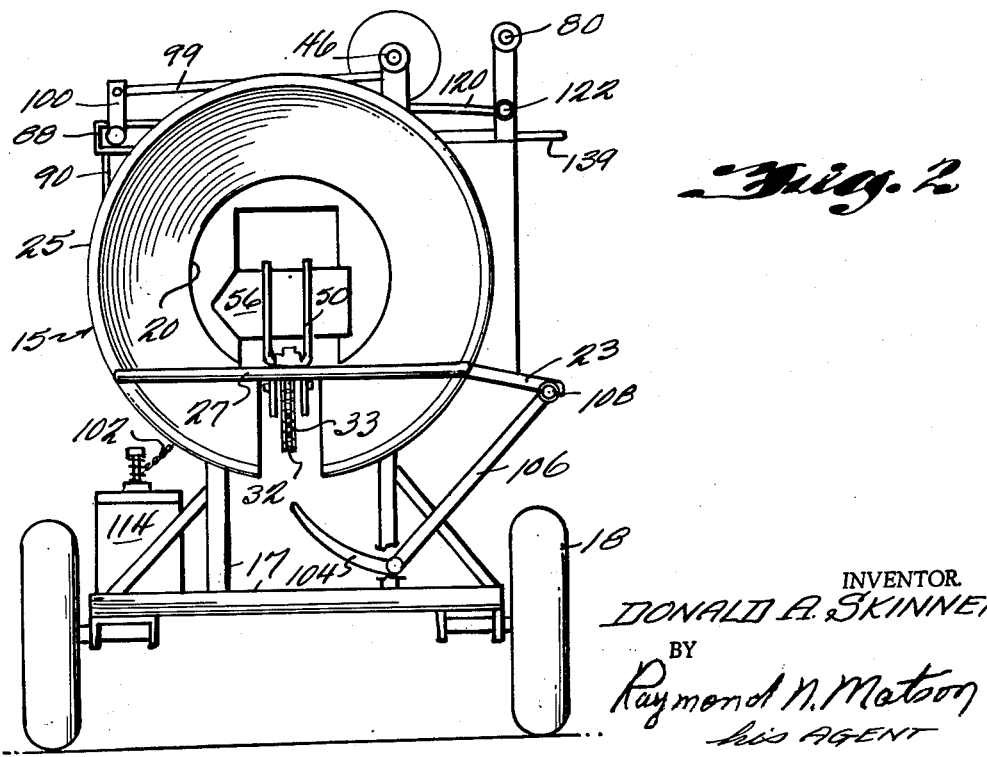
FIGURE 2 is an elevational view of the left or tree feeding end thereof.

As the main drive shaft 46 continues on a single revolution, the pusher forks 90 move rearwardly, the needles 104 drop back toward the position of FIGURE 2, and the shaft 122 is rocked by the engagement of the cam plate 132 on shaft 46 (FIGURE 4) with the cam arm 130 to swing the arcuate ejector rods 120 down through the apertures 128 to engage the baled tree and eject it forwardly onto the discharge platform 23. As the tree (or trees) is ejected, it moves away from its contact with the trip lever 56 which is returned to the at-rest position by the spring 86 to disengage the clutches 70 and 82 and stop rotation of the main drive shaft 46 ready for another tree and another single revolution cycle of baling operation with the operation of all units of the apparatus being thus completely synchronized.

It is to be understood that the form of the invention herewith shown and described is to be taken as a preferred example of the same and that various changes in the shape, size and arrangement of part may be resorted to without departure from the spirit of the invention or the scope of the subjoined claims.

I claim:

1. An apparatus for baling trees comprising an elongated tubular housing open at a front side and one end, a tree compressing funnel mounted on and communicating with said end, conveyor means for engaging a tree and drawing it through said funnel into said housing, power means connectible with said conveyor to effect movement of a tree through said compressing funnel and into said housing and plural cooperating means connectible with said power means and actuated by said compressed tree to further compress the tree, tie twine thereabout, and eject it through the open front side of said housing.

2. The apparatus recited in claim 1, and means for automatically disengaging said conveyor means from said tree after movement thereof into said housing.

3. The apparatus recited in claim 1 wherein said plural cooperating actuated means includes a lever movable to deactuate said actuated means upon ejection of the tree from said housing.

4. An apparatus for baling trees comprising, in combination, an elongated tubular housing open at a front side and one end, a tree compressing funnel mounted on and communicating with said end, the bottom of said housing and said funnel including a slot coextensive therewith, an endless conveyor mounted adjacent said slot and including a tree-engaging hook projecting upwardly through said slot and movable along the length thereof, power means connectible with said conveyor to effect movement of a tree through said compressing funnel and into said housing, and cyclicly operated means connectible with said power means to sequentially wrap and tie twine about a compressed tree and eject it from the housing.

5. The combination recited in claim 4, and means mounted on and movable in said housing to further compress the tree before the wrapping and tying thereof.

6. The combination recited in claim 4 wherein a track is mounted along said slot, said hook is maintained in upward projecting position by hook supporting rollers moving in said track, and said track terminates adjacent the other end of said housing to effect tilting of said hook to effect disengagement from a tree.

7. The combination recited in claim 4, a source of twine for said wrapping and tying means, and tension means comprising a spring pressed plate for applying tension to the twine as it passes from the source to said wrapping and tying means.

8. The combination recited in claim 4, a manually operable clutch connecting said power means and said conveyor, and a bar fixed to said conveyor and engageable with said clutch to disconnect said power means and said conveyor upon movement of a tree into said housing.

9. The combination recited in claim 4, clutch means operable to connect said power means and said cyclicly operated means, and a trip lever connected to said clutch to operate it when engaged by a tree in said housing.

10. The combination recited in claim 4, a manually operable clutch connecting said power means and said conveyor, a bar fixed to said conveyor and engageable with said clutch to disconnect said power means and said conveyor upon movement of a tree into said housing, second clutch means operable to connect said power means and said cyclicly operated means, and a trip lever connected to said second clutch means to operate it when engaged by a tree in said housing.

References Cited in the file of this patent

UNITED STATES PATENTS

| 2,792,775 | Beyette | May 21, 1957 |
| 2,867,166 | Saxton et al. | Jan. 6, 1959 |
| 2,974,457 | Saxton | Mar. 14, 1961 |

FOREIGN PATENTS

| 176,621 | Sweden | Sept. 19, 1961 |
| 650,785 | Canada | Oct. 23, 1962 |